US011504849B2

(12) United States Patent
Mao et al.

(10) Patent No.: US 11,504,849 B2
(45) Date of Patent: Nov. 22, 2022

(54) DETERMINISTIC ROBOT PATH PLANNING METHOD FOR OBSTACLE AVOIDANCE

(71) Applicant: EDDA TECHNOLOGY, INC., Princeton, NJ (US)

(72) Inventors: Yuanfeng Mao, Mt Laurel, NJ (US); Guo-Qing Wei, Plainsboro, NJ (US); Firdous Saleheen, Lawrenceville, NJ (US); Li Fan, Belle Mead, NJ (US); Xiaolan Zeng, Princeton, NJ (US); Jianzhong Qian, Princeton Junction, NJ (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 140 days.

(21) Appl. No.: 16/692,246

(22) Filed: Nov. 22, 2019

(65) Prior Publication Data

US 2021/0154841 A1 May 27, 2021

(51) Int. Cl.
*B25J 9/16* (2006.01)

(52) U.S. Cl.
CPC ... *B25J 9/1666* (2013.01); *G05B 2219/40371* (2013.01); *G05B 2219/40476* (2013.01)

(58) Field of Classification Search
CPC ...... B25J 9/1602; B25J 9/1605; B25J 9/1628; B25J 9/163; B25J 9/1664; B25J 9/1666; B25J 9/1671; B25J 9/1674; B25J 9/1676; G05B 2219/40476; G05B 2219/39082; G05B 2219/39091; G05B 2219/40371; G05B 2219/40455
See application file for complete search history.

(56) References Cited

U.S. PATENT DOCUMENTS

| | | |
|---|---|---|
| 2008/0012589 A1 | 5/2008 | Wang |
| 2013/0032502 A1 | 12/2013 | Anderson et al. |
| 2014/0003968 A1 | 1/2014 | Gros-D'Aillon et al. |

(Continued)

FOREIGN PATENT DOCUMENTS

WO    WO-2016119829 A1 * 8/2016 ............ B25J 9/1682

OTHER PUBLICATIONS

Steven M. Lavalle et al., "Randomized Kinodynamic Planning," The International Journal of Robotics Research, May 1, 2001, vol. 20, Issue 5, pp. 378-400.

(Continued)

*Primary Examiner* — Spencer D Patton
(74) *Attorney, Agent, or Firm* — Venable LLP

(57) ABSTRACT

The present teaching relates to a method and system for path planning. A target is tracked via one or more sensors. Information of a desired pose of an end-effector with respect to the target and a current pose of the end-effector is obtained. Also, a minimum distance permitted between an arm including the end-effector and each of at least one obstacle identified between the current pose of the end-effector and the target is obtained. A weighting factor previously learned is retrieved and a cost based on a cost function is computed in accordance with a weighted smallest distance between the arm including the end-effector and the at least one obstacle, wherein the smallest distance is weighted by the weighting factor. A trajectory is computed from the current pose to the desired pose by minimizing the cost function.

16 Claims, 4 Drawing Sheets

(56) References Cited

U.S. PATENT DOCUMENTS

2015/0088310 A1\* 3/2015 Pinter .................... B25J 9/1676
700/253
2016/0022187 A1 8/2016 Pushpala et al.
2020/0376663 A1\* 12/2020 Voelz ..................... B25J 9/1664
2021/0138656 A1\* 5/2021 Gothoskar ............. B25J 9/1605

OTHER PUBLICATIONS

Peter E. Hart et al., "A formal basis for the heuristic determination of minimum cost paths," IEEE transactions on Systems Science and Cybernetics, vol. SSC-4, No. 2, Jul. 1968.
International Search Report and Written Opinion dated Feb. 4, 2020 in International Application PCT/US2019/062766.
Mainprice, Jim et al., Goal Set Inverse Optimal Control and Iterative Re-planning for Predicting Human Reaching Motion in Shared Workspaces, Jun. 7, 2016.

\* cited by examiner

DETERMINISTIC ROBOT PATH PLANNING METHOD FOR OBSTACLE AVOIDANCE

BACKGROUND OF THE INVENTION

1. Field of the Invention

The present disclosure relates to a system and method of robot path planning for obstacle avoidance. In particular, the present disclosure is related to planning robotic arm movement to avoid obstacles by a deterministic method.

2. Description of Related Art

Existing path planning methods for robots may be categorized into two types: non-deterministic and deterministic. Non-deterministic methods, such as the Rapidly Exploring Random Tree (RRT) algorithm, explore the next movement of a robot randomly, with a bias toward large unsearched areas. The resulting movements maybe different if re-planned for a second time due to the random nature of the search. The deterministic methods, such as the A* algorithm, minimize a cost function to produce a fixed path. The present teaching belongs to the deterministic category.

In order to avoid an obstacle, existing path planning methods may need to specify a safety distance. The safety distance is a minimum distance that the robot may need to maintain from the obstacle. The obstacle may be first modelled. Then the model shape may be expanded by the specified distance. The region occupied by the grown or expanded obstacle may be marked as a region where the robot should not move to. Since it is required that the expanded region be convex, the actual growing distance may be much larger than the minimum safety distance, resulting in oversized obstacles with uneven safety margins from the obstacle surface. This may limit the path planned by any algorithms to be sub-optimal.

Therefore, it is highly desirable to have an obstacle avoidance path-planning method that does not need to expand an obstacle and thus avoids the use of an oversized obstacle distance.

BRIEF DESCRIPTION OF THE DRAWINGS

Aspects of the present disclosure described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The present disclosure is directed to a method and system for robot path planning while avoiding obstacles. Specifically, it is directed to robot arm movement with multiple joints.

Figure 1:
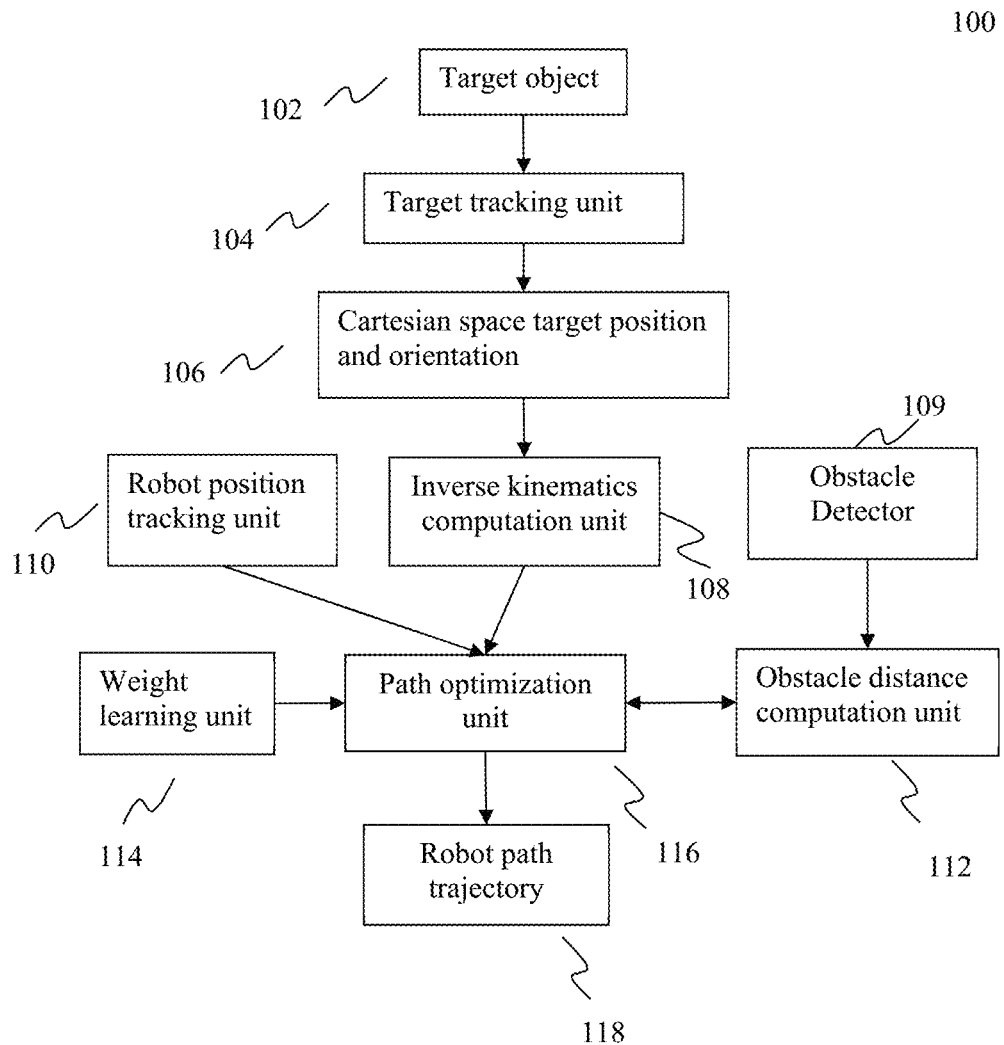
FIG. 1 shows an exemplary system diagram for robot path planning.

FIG. 1 shows an exemplary system diagram 100 facilitating robot path planning, according to an embodiment of the present teaching. The system 100 comprises a target tracking unit 104, an inverse kinematics computation unit 108, a robot position tracking unit 110, an obstacle detector 109, an obstacle distance computation unit 112, a weight learning unit 114, and a path optimization unit 116.

The target object 102 may be a patient, an assembly part or any other subject upon which the robot may need to reach to perform certain operations, such as placing a needle with respect to a patient, grasping an industrial part in an assembly line, etc. By one embodiment, the robot may include an arm comprising of multiple joints. For example, typical robots may have arms with 6 or 7 joints, meaning that the robot may have 6 or 7 degrees of freedom (DOF) in movement. The desired relative position and orientation of the robot's end-effector (i.e., a device or tool connected at an end of the robot's arm) with respect to the target object may be pre-defined. We use the term goal position to represent the desired absolute robot's end-effector's position and orientation. If the target object is static, the goal position of the robot is fixed. If the target object is in motion, the target tracking unit 104 may sense the motion of the target object and provide an update for the goal position. The sensing method may be performed by a plurality of sensors and may include, but is not limited to, methods such as camera-based vision tracking, optical sensor-based tracking, magnetic sensor-based tracking. The output 106 of the tracking unit 104 is the goal position in a first coordinate system, e.g., the cartesian coordinate system. Since the robot is commanded to move in a joint-angle space i.e., a second coordinate system, the cartesian goal position may be converted to the joint-angle goal position by the inverse kinematics computation unit 108. The robot position tracking unit 110 may provide the robot's joint angles at the starting position of the end-effector. We use the term initial position to represent the starting configuration of the robot. It must be appreciated that the body of the robot (i.e., the arm) and the end-effector may be modeled as a single entity or alternatively modeled as separate entities. During robot movement, the robot position tracking unit 110 may constantly provide the robot's current joint angles e.g., current configuration of the end effector. This may be useful for path re-planning in circumstances where the obstacle is in motion or the target is in motion. The obstacle distance computation unit 112 may compute a minimum distance between the robot's arm (including the end-effector) and one or more obstacles that are each identified by an obstacle detector 109. The obstacle may be a surgeon, a patient's body part, or another medical device in the operating room. The weight learning unit 114 may learn a weighting parameter (also referred to herein as a weighting factor) to be used for path planning. The path optimization unit 116 may find the best path between the robot initial position and the goal position. The output of the path optimization unit is a motion trajectory 118, which specifies the sequences of robot motion to reach the goal position.

Figure 2:
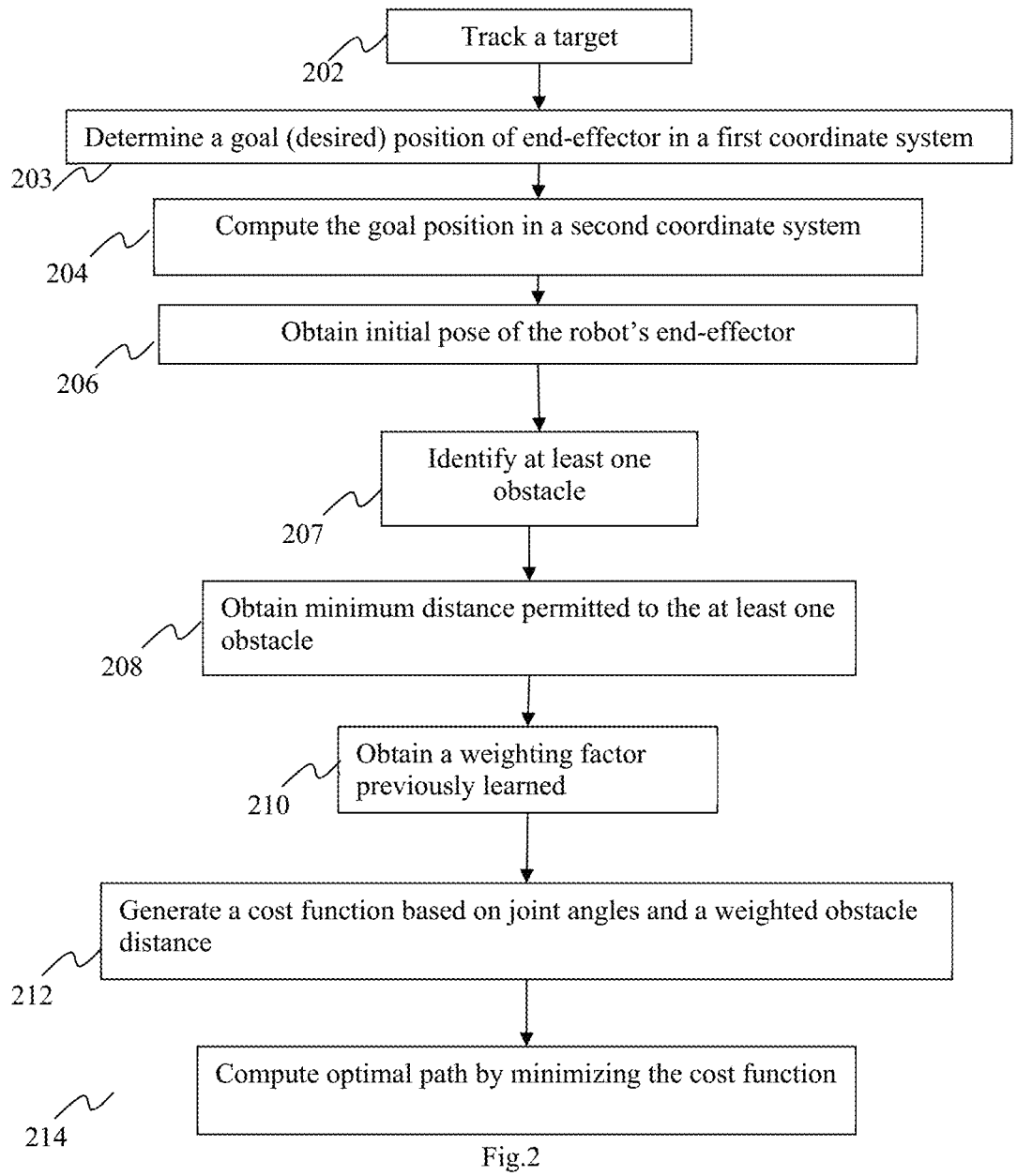
FIG. 2 illustrates an exemplary flow diagram for path planning.

FIG. 2 illustrates an exemplary flow diagram for robot path planning, according to one embodiment of the present teaching. At step 202, the target object may be tracked. An updated goal position for the end-effector in a first coordinate system e.g., cartesian coordinate system may be obtained at step 203 based on the tracking.

At step 204, the cartesian goal position may be converted to a goal position in a second coordinate system e.g., the joint-angle coordinate system, based on the robot inverse kinematics. At step 206, the robot's initial pose at the starting position (i.e., an orientation and location of the end effector) may be obtained. At step 207, at least one obstacle may be identified. At step 208, a minimum distance permitted with respect to the at least one identified obstacle may be determined based on the nature of the obstacle and the application. The minimum distance permitted may be used to learn a weighting parameter at step 210. At step 212, a cost function may be generated based on joint angles and a weighted obstacle distance along the trajectory. The trajectory that minimizes the cost function may be found at step 214.

The details of the cost function and minimization are described below. Suppose a trajectory includes N steps, 1, 2, . . . , N. At any intermediate step n, the cost from the starting position to the n-th position may be denoted by $g(n)$. The cost $g(n)$ may be defined as the Euclidian distance between the joint angles (i.e., configuration of the end-effector) at the initial position and those at the n-th step. Another cost that provides an estimate of the cost from the n-th step to the ending step (N) may be denoted by $h(n)$. The cost $h(n)$ may be defined as the Euclidian distance between the joint angles at the n-th step and those at step N (the goal position). Denote the minimum distance, i.e., smallest distance, of the robot arm (including end-effector) from all the obstacles at step n by $c(n)$. The total cost function $f(n)$ at the n-th step may take the form of $$f(n)=g(n)+h(n)-\omega*c(n) \quad (1)$$

where $\omega$ is a constant weighting factor greater than zero. The weight $\omega$ balances between the joint angle cost and the obstacle-distance cost. The weighting factor may be learned through the procedure described for step 210 below. The minimization of the cost function $f(n)$ may be performed using an existing method, such as the A* algorithm. In the A* algorithm, the robot joint angle space may be discretized to certain resolution. The search for the optimal path may be performed in the discretized joint angle space. The output of the minimization is a sequence of steps of robot motion from the initial position to the goal position.

It must be appreciated that since the target object may be tracked, if the robot has initiated the movement to the target and the target is found to be in motion, the path-planning may be restarted to find a new path to the new goal position on-the-fly. Due to the discretization of the joint angle space, the minimum distance from any discretized point to the obstacle may be pre-computed, and the minimum obstacle distance $c(n)$ at step n may be obtained through a look-up table without having to do on-line computation.

Figure 3:
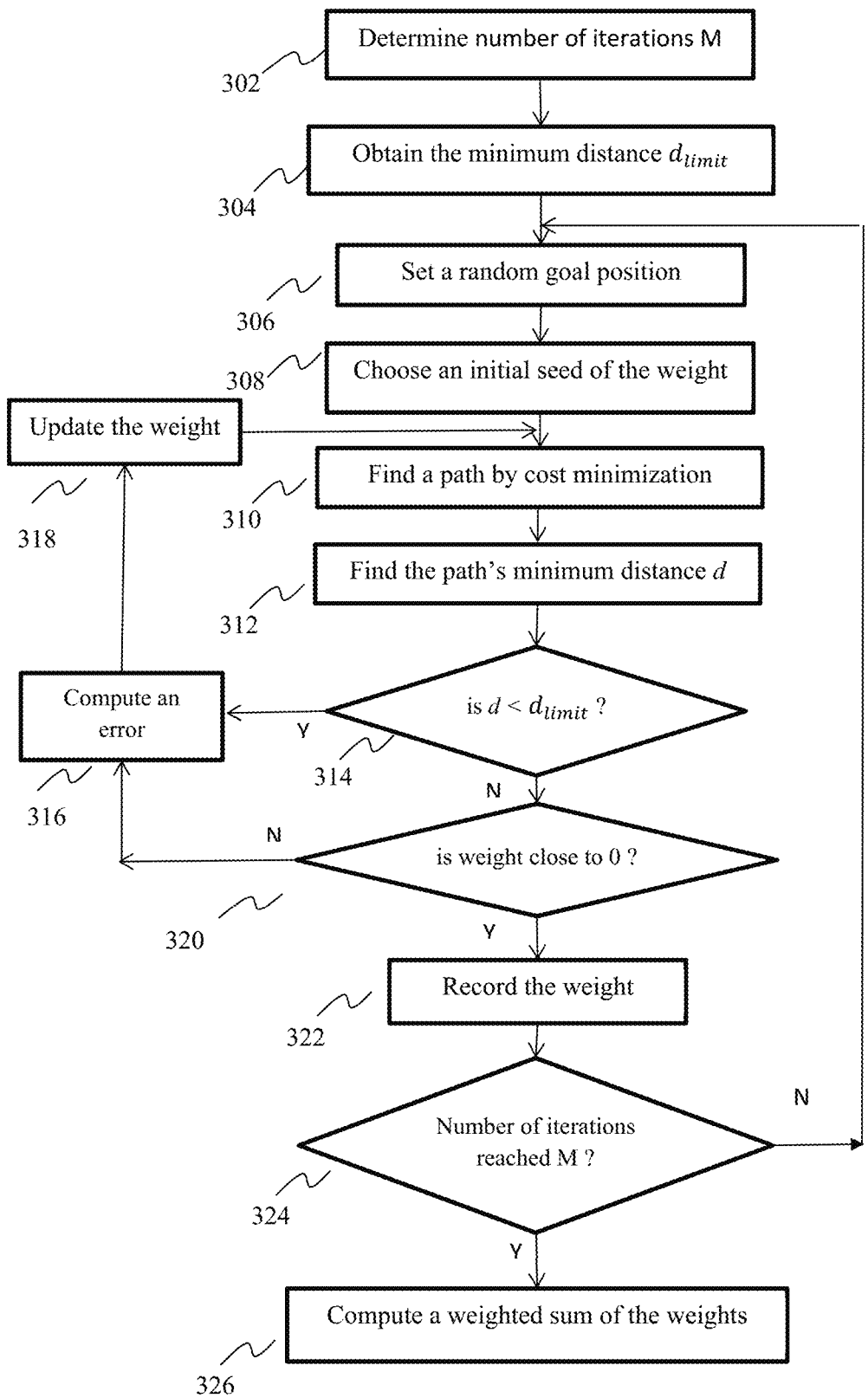
FIG. 3 illustrates an exemplary flow diagram for weight learning for path planning.

FIG. 3 illustrates an exemplary flowchart of weight learning for step 210 of FIG. 2, according to one embodiment of the present teaching. At step 302, the number of learning steps M, also called the number of iterations, may be specified. This number may be chosen empirically. In other words, in step 302 a stopping condition for the weight learning process i.e., number of iterations is determined. At step 304, the allowed minimum distance $d_{limit}$ to the one or more obstacles may be obtained. This number may be dependent on the nature of the obstacle(s). For example, for a critical obstacle, such as human, this distance may be chosen larger than for a non-critical obstacle. At step 306, a random goal position (i.e., desired or final position) may be generated. The generated random goal position may need to cover the typical end-effector's position and orientation in the robot's working space. At step 308, an initial guess (i.e., an initial seed) of the weighting factor may be chosen. Based on the initial weight, a similar cost function as Equation (1) above may be formed. An optimal path may be found at step 310, based on the cost minimization using the A* algorithm. After the optimal motion trajectory is obtained, the actual minimum distance d of the robot arm (including the end-effector) with respect to the obstacles along the trajectory may be computed at step 312. At step 314, it may be decided whether the minimum distance d is less than the specified permitted minimum distance $d_{limit}$. If the actual minimum distance is less than the permitted minimum distance, step 316 may be invoked to compute an error e. Otherwise it may further check whether the current weight is already close to or equal to zero at step 320. If the current weight is not close or equal to zero, the workflow goes to step 316 to compute an error. The error at step 316 may be a simple difference between the permitted minimum distance and the actual minimum distance as $e=d_{limit}-d$. It may also be a function, such as a polynomial or exponential function, of the simple difference, with the sign being the same as that of the simple difference. At step 318, the error may be used to update the weight. By one embodiment, the weighting factor may be updates as follows:

$$\omega_{new}=\omega_{old}+s*e \quad (2)$$

where s is a positive scale factor, chosen empirically. After the weight is updated, a path re-planning may be performed. An intuitive interpretation of the update procedure is that if e is positive, meaning that the actual minimum distance is smaller than the allowed minimum distance, the weight may need to be incremented, to pull the path away from the obstacle. Otherwise, if e is negative, the weight may be decremented, to push the path closer to the obstacle. At step 320, if it is determined that the weight satisfies a criterion, i.e., the weighting factor is already close to (i.e., substantially close to zero within a predetermined amount) or equal to zero, no further update of the weight may be made, since the weight must be greater than zero. The resulting weight may be recorded at step 322. At step 324, it may be checked if the specified maximum number of iterations M has been reached. If not, a new iteration may follow. Steps starting from step 306 may be repeated. Otherwise, a weighted sum of all the weights recorded at step 322 may be computed at step 326 to serve as the final weight learned by the learning process.

The weighted sum of the weights at step 326 may be computed as a simple arithmetic average. It may also be computed according to the probability of occurrence for the randomly generated target position. Such probabilities may be used to weigh the weighting factor recorded at step 322 by the form $\omega=\Sigma_{i=0}^{M}q_i*\omega_i$, where $q_i$ is the probability of the i-th goal position and $\omega_i$ is the learned weight for the i-th goal position.

Figure 4:
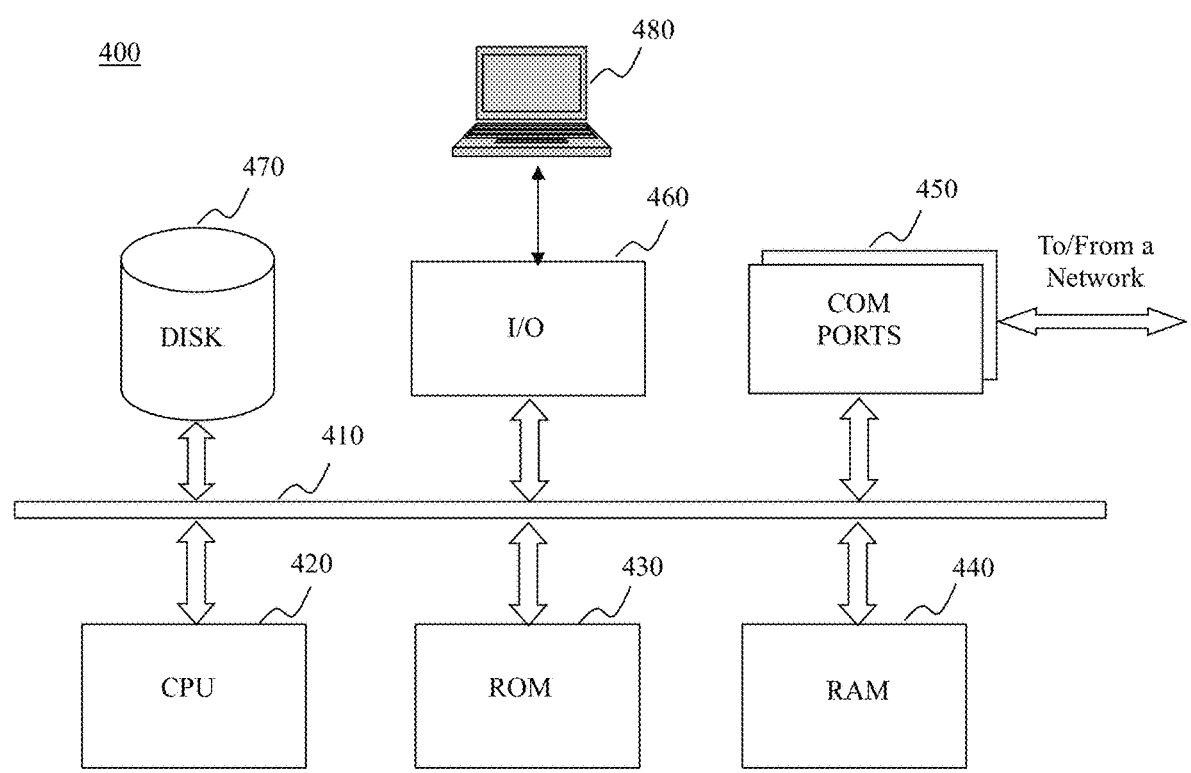
FIG. 4 depicts an architecture of a computer which can be used to implement a specialized system incorporating the present teaching.

FIG. 4 is an illustrative diagram of an exemplary computer system architecture, in accordance with various embodiments of the present teaching. Such a specialized system incorporating the present teaching has a functional block diagram illustration of a hardware platform which includes user interface elements. Computer 400 may be a general-purpose computer or a special purpose computer. Both can be used to implement a specialized system for the present teaching. Computer 400 may be used to implement any component(s) described herein. For example, the present teaching may be implemented on a computer such as computer 400 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 400, for example, may include communication ports 450 connected to and from a network connected thereto to facilitate data communications. Computer 400 also includes a central processing unit (CPU) 420, in the form of one or more processors, for executing program instructions. The exemplary computer platform may also include an internal communication bus 410, program storage and data storage of different forms (e.g., disk 470, read only memory (ROM) 430, or random access memory (RAM) 440), for various data files to be processed and/or communicated by computer 400, as well as possibly program instructions to be executed by CPU 420. Computer 400 may also include an I/O component 460 supporting input/output flows between the computer and other components therein such as user interface elements 1480. Computer 400 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer of the robot's motion planning system into the hardware platform(s) of a computing environment or other system implementing a computing environment or similar functionalities in connection with path planning. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the robot's motion planning system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed:
1. A method, implemented on a machine having at least one processor, storage, and a communication platform capable of connecting to a network for path planning, the method comprising:
   tracking, via one or more sensors, a target;
   obtaining information of a desired pose of an end-effector with respect to the target;
   obtaining a current pose of the end-effector;
   obtaining a minimum distance permitted between an arm including the end-effector and each of at least one obstacle identified between the current pose of the end-effector and the target;
   retrieving, prior to computing a cost function, a weighting factor, the weighting factor defining a relationship between a joint angle cost and an obstacle-distance cost, wherein the weighting factor is iteratively learned over a predetermined number of iterations;
   for each iteration of the predetermined number of iterations:
      generating a random desired position of the end-effector;
      selecting an initial value of the weighting factor;
      minimizing the cost function based on the initial value; and
      determining a path based on the minimizing;
   computing a cost based on the cost function in accordance with a weighted smallest distance between the arm including the end-effector and the at least one obstacle, wherein the smallest distance is weighted by the weighting factor; and
   computing a trajectory from the current pose to the desired pose by minimizing the cost function.

2. The method of claim 1, further comprising:
obtaining, based on the path, an actual minimum distance of the arm including the end-effector with respect to the at least one obstacle;
computing an error corresponding to a difference between the actual distance and the minimum distance permitted; and
updating the weighting factor based on the error.

3. The method of claim 2, wherein the weighting factor is updated based on the error and a positive scale parameter.

4. The method of claim 2, further comprising: determining, whether the weighting factor satisfies a criterion;
in response to the weighting factor satisfying the criterion, recording the weighting factor corresponding to the iteration; and
in response to weighting factor not satisfying the criterion, updating the weighting factor.

5. The method of claim 4, further comprising:
in response to completing the predetermined number of iterations, computing a weighted sum of the recorded weighing factors of each iteration.

6. The method of claim 1, wherein the minimum distance permitted between the arm including the end-effector and each of at least one obstacle is determined based on a type of the at least one obstacle.

7. The method of claim 1, wherein the step of obtaining information of a desired pose of an end-effector with respect to the target, further comprises:
obtaining the desired pose of the end-effector in a first coordinate system; and
transforming the desired pose of the end-effector from the first coordinate system to a second coordinate system.

8. The method of claim 1, wherein the weighting factor is greater than zero.

9. A system for path planning, the system comprising: at least one processor configured to
track, via one or more sensors, a target;
obtain information of a desired pose of an end-effector with respect to the target; obtain a current pose of the end-effector;
obtain a minimum distance permitted between an arm including the end-effector and each of at least one obstacle identified between the current pose of the end-effector and the target;
retrieve, prior to computing a cost function, a weighting factor, the weighting factor defining a relationship between a joint angle cost and an obstacle-distance cost, wherein the weighting factor is iteratively learned over a predetermined number of iterations;
for each iteration of the predetermined number of iterations:
generate a random desired position of the end-effector;
select an initial value of the weighting factor;
minimize the cost function based on the initial value; and
determine a path based on the minimizing;
compute a cost based on a cost function in accordance with a weighted smallest distance between the arm including the end-effector and the at least one obstacle, wherein the smallest distance is weighted by the weighting factor; and
compute a trajectory from the current pose to the desired pose by minimizing the cost function.

10. The system of claim 9, wherein the at least one processor is further configured to:
obtain, based on the path, an actual minimum distance of the arm including end-effector with respect to the at least one obstacle;
compute an error corresponding to a difference between the actual distance and the minimum distance permitted; and
update the weighting factor based on the error.

11. The system of claim 10, wherein the weighting factor is updated based on the error and a positive scale parameter.

12. The system of claim 10, wherein the at least one processor is further configured to:
determine, whether the weighting factor satisfies a criterion;
in response to the weighting factor satisfying the criterion, record the weighting factor corresponding to the iteration; and
in response to weighting factor not satisfying the criterion, update the weighting factor.

13. The system of claim 12, wherein the at least one processor is further configured to:
in response to completing the predetermined number of iterations, compute a weighted sum of the recorded weighing factors of each iteration.

14. The system of claim 9, wherein the minimum distance permitted between the arm including the end-effector and each of at least one obstacle is determined based on a type of the at least one obstacle.

15. The system of claim 9, wherein the at least one processor is further configured to:
obtain the desired pose of the end-effector in a first coordinate system; and transform the desired pose of the end-effector from the first coordinate system to a second coordinate system.

16. The system of claim 9, wherein the weighting factor is greater than zero.

* * * * *